Jan. 24, 1961  J. SWERDLOFF ET AL  2,968,857
HIGH BULK FILAMENTARY MATERIAL AND METHODS OF PRODUCING THE SAME
Filed July 30, 1957
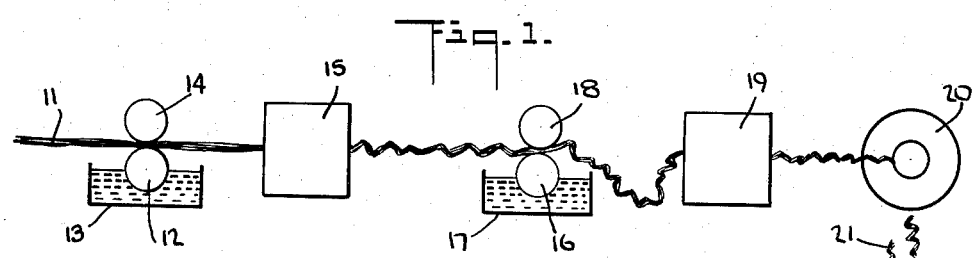
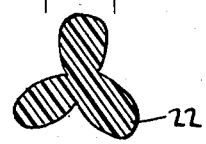
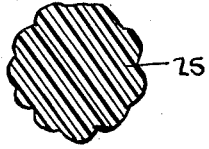
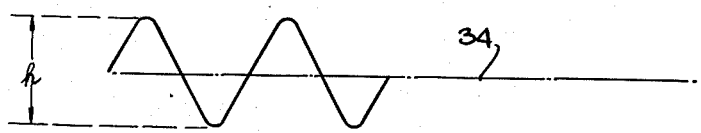
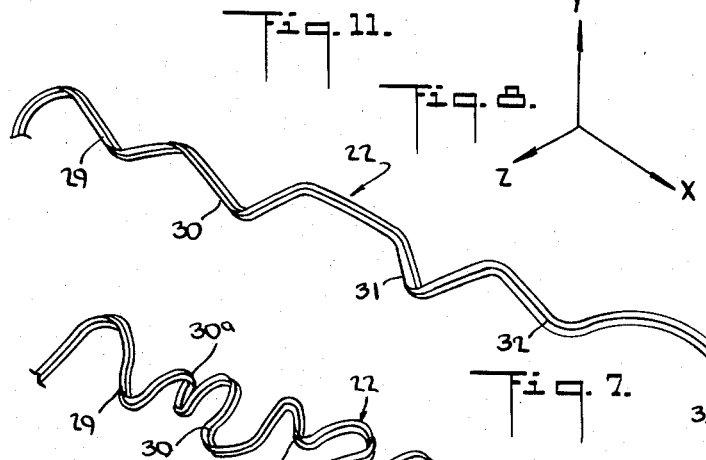
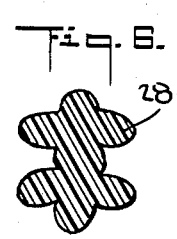
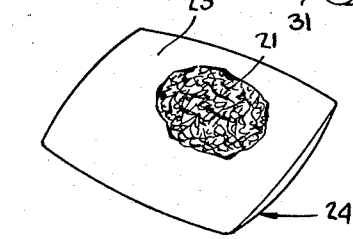
INVENTORS
JACK SWERDLOFF
EZRA BEN LARSEN
BY ADRIAAN JOHAN TROELEMAN
Felix Klass + Leonard Horn
ATTORNEYS

United States Patent Office 2,968,857
Patented Jan. 24, 1961

2,968,857

HIGH BULK FILAMENTARY MATERIAL AND METHODS OF PRODUCING THE SAME

Jack Swerdloff, Charlotte, N.C., and Ezra B. Larsen, Pearisburg, and Adriaan J. Troeleman, Narrows, Va., assignors to Celanese Corporation of America, New York, N.Y., a corporation of Delaware Filed July 30, 1957, Ser. No. 675,120

18 Claims. (Cl. 28—72)

The present invention relates to high bulk filamentary material. More particularly, it relates to filamentary material, i.e. continuous filaments or staple fibers, of organic acid esters of cellulose, which is especially suited as a filling or stuffing material. The present invention also relates to the process or method used for manufacturing the high bulk filamentary material, and to the application of this material in the trade.

Synthetic filamentary materials such as cellulose esters are formed by extrusion of solutions through orifices in a member known as a jet. The orifices are small and usually circular so that the resulting filamentary materials are bulbous or generally circular in cross-section, although the surface of the said materials is normally crenulated and irregular. Consequently, the specific volume or volume per unit mass of such material is comparatively low, so that a predetermined weight will occupy less volume than that desired for certain applications.

It is an object of the present invention to provide filamentary materials of comparatively high specific volume, i.e. of high bulk, and to provide a process for manufacturing these filamentary materials.

It is another object of the present invention to provide articles such as pillows and mattresses filled or stuffed with high-bulk materials, which articles will be light in weight and comfortable but nonetheless moderately firm and resilient.

Other objects and advantages of the invention will become apparent from the detailed description and claims which follow.

In accordance with the invention, filament-forming materials such as cellulose esters are spun, i.e. extruded through orifices in jets and the filamentary material is then subjected to at least two crimping operations to impart thereto a non-rectilinear configuration. The first crimping operation increases the bulk or specific volume because adjacent filaments cannot pack as closely. The second crimping operation introduces additional crimps and these deformations will lie in a plurality of planes directed at an angle to that generally defined by the first crimping. Thus the filamentary material is "three dimensional" and has a still higher specific volume.

Before each crimping, which is preferably effected by use of a stuffing box so as to avoid tearing of the filamentary material such as results when using a gear toothed crimper which pulls the filaments into their new shapes, the filamentary material is moistened with water or an aqueous solution of a softening agent. In addition to avoiding weakening of the filaments, the use of a plurality of stuffing box crimpers in succession ensures that the crimps will be randomly distributed along the filaments and in a multiplicity of planes so that the specific volume will not be diminished due to packing of adjacent filaments.

In a preferred embodiment of the invention, the filamentary material is spun through spinning jets having non-circular apertures so that the filamentary material after crimping will have high resilience and a specific volume at least 20% greater than that of a mass of crimped circular filaments of equal denier, i.e. of equal cross-sectional area. The preferred filamentary cross-section is Y-shaped, such as is produced by spinning through triangular orifices. However, mixtures of filaments spun through differently shaped non-circular orifices may be used. Minor amounts of filaments spun through circular orifices can be included. Accordingly, if filaments spun through circular orifices are included, they should be used only in such an amount as will still leave the total specific volume after crimping at least 20% greater than that of a mass spun wholly through circular orifices.

The invention will now be described with reference to the accompanying drawing wherein:

Fig. 1 is a schematic illustration of the process;

Figs. 2 to 6 are cross-sectional views of different shapes of filaments which can be spun and processed in accordance with the invention;

Fig. 7 is a schematic perspective view of a portion of a filament having the shape shown in Fig. 2 and subjected to one crimping operation;

Fig. 8 is a perspective vector diagram for defining the spatial disposition of the filament of Fig. 7;

Fig. 9 is a schematic perspective view of a portion of the filament of Fig. 7 after being subjected to a second crimping operation;

Fig. 10 is a perspective view of a pillow, a portion being shown broken away to expose the stuffing; and Fig. 11 is a sketch diagrammatically defining the amplitude and number of crimps per unit length as employed herein.

Referring now more particularly to the drawing, a lubricated tow 11 of filaments of cellulose acetate is passed over a roller 12 dipping into a trough 13 containing water or a water emulsion of lubricants and softening agents. Another roller 14 flattens out the tow 11 somewhat to ensure wetting of all filaments.

The tow passes through a first stuffing box crimper 15 which crimps the tow, imparting to each filament an appearance somewhat as is shown in Fig. 7. The tow then passes over a further roller 16 dipping into a trough 17 which contains water or other lubricant. An upper roller 18 ensures wetting of all filaments of the tow 11. The tow next passes into a second stuffing box crimper 19 and the discharged tow is dried and cut by cutter 20 into staple lengths 21. The filaments 22 of the tow which leaves the crimper 19 have the approximate appearance shown in Fig. 8.

The staple lengths 21 of multi-crimped cellulose acetate can be used to stuff a ticking 23 to form a pillow 24 as shown in Fig. 10. The fibers are also useful as fillings for other articles such as mattresses, comforters, jacket interlinings and the like.

The filaments can be Y-shaped in cross-section as shown at 22 in Fig. 2, this configuration resulting upon drying and shrinking of filaments spun through a jet having triangular orifices. The non-circular contour produces a high bulk or specific volume which is increased by the successive crimpings. The cross-sectional shape of the filaments resists bending and deformation which is particularly desirable for stuffings and battings. This resistance gives the stuffed article a resilient quality in addition to its light weight resulting from the low specific volume of the filling.

The individual filaments can be substantially circular in cross-section as shown at 25 in Fig. 3 but such filaments will have a lower specific volume than either filament 22 or filaments 26, 27 or 28 (Figs. 4 to 6), respectively produced by spinning through slotted, square or star-shaped orifices.

The denier of the individual filaments can range from 3 or even lower to as much as 25 or even higher. Preferably, however, it lies between 5 and 10. The number of filaments per yarn end will depend upon the number of holes per jet and the number of yarns which may be gathered into a tow will depend upon the capacity of the crimping devices.

The filaments preferably are treated with a lubricant or finish ranging from about 0.3 to 2.0% by weight of the filamentary material. An especially soft luxurious hand will result from use of a finishing composition comprising one of the cationic group of softeners such as a quaternary ammonium compound, or other chemical softener imparting a similar hand. An even bulkier yarn will result by substituting as the lubricant an alkyl phosphate in mineral oil, especially compositions such as that described in Example III of Fortess et al. U.S. Patent No. 2,676,924 of April 27, 1954.

The cutter 20 can constitute any device known in the art, such as a reciprocating blade or a rotary cutter. The cutter can be operated to form staple fibers ranging in length from ½ to 8 inches, although they preferably range in length from 1 to 4 inches.

The crimpers 15 and 19 can constitute an apparatus such as that described in Upton et al. U.S. Patent No. 2,693,008 of November 2, 1954, or any other equivalent device. The function of the second crimper can be appreciated by a comparison of Figs. 7 and 9 which respectively show the spatial configuration of one filament 22 before and after it leaves crimper 19. In Fig. 7 the filament 22 has a predominantly two-dimensional sinusoidal or saw-tooth configuration, comprising crimps 29, 30, 31, 32 and 33 generally in the X—Y plane of Fig. 8. In Fig. 9 it can be seen that after the second crimping the filament 22 is crimped more randomly and without large lengths wholly devoid of crimp. The crimp 30, for example, has had impressed therein a sub-crimp 30a which has been deflected out of the X—Y plane toward the X—Z plane. Sub-crimp 31a has been formed out of a comparatively straight section of crimp 31 and is generally directed in still another plane. Portions of the other crimps are similarly affected so that a filament of higher crimp and bulk is achieved.

Each crimper 15, 19 can generally impart from about 5 to 8 crimps per inch of an amplitude ranging from about 0.5 to 4.0 mm., and the two crimpers are conveniently synchronized in speed, so that the second operates a little more slowly than the first but sufficient to receive the filaments at the same rate they are discharged from the first crimper. For example, the tow may be fed to the first crimper at the rate of 400 meters per minute, and to compensate for shrinkage due to crimping, it may be fed to the second crimper at the rate of 250–300 meters per minute. A reserve of filaments can be provided before the second crimper to compensate for any minor variations in feed rate. Because of the irregular crimping action of each crimper, the second crimper can produce deviations in the X—Y plane itself, thereby modifying the generally sinusoidal pattern within that plane. The successive crimpings need not be performed in tandem but instead the tow can be collected after the first crimping and can then be lubricated and again crimped at a different rate, further to modify the crimp pattern.

The multi-crimping in accordance with the present invention will serve to increase the total crimp of the filaments to about 7 to 10 crimps per inch, for example, without undue mechanical strain, it will ensure a more permanent "set" of the crimps and it will ensure more uniform crimp frequency, i.e. fewer sections of the filaments will have no or only low crimp.

Fig. 11 illustrates the definition of the crimps as employed herein. A length of filament 34, shown as a dot and dash line before crimping, and assumed to be one inch, after crimping will be shortened. The number of peaks in the crimped fiber will represent the crimps per inch, i.e. two, and the amplitude $h$ will be equal to the distance between peaks and valleys. In determining the crimps per inch of an already crimped fiber, the peaks are first counted, the fiber is tensioned so as to be straight, and the straight length of the fiber is determined. The number of peaks divided by the straightened length in inches is the number of crimps per inch.

The sequence of treatments indicated can be varied in that the tow can first be cut into staple fibers, formed into a sliver and then double-crimped or the cutting can take place after the first crimping operation but before the second crimping operation. The lubrication in these modifications can be applied either to the tow or the sliver.

The invention is generally applicable to filamentary materials of various kinds including synthetic polyamides such as polyhexamethylene adipamide and polyaminocaproic acid, polyesters such as polyethylene terephthalate, polyurethanes, polyaminotriazoles, and polymers and copolymers of vinyl chloride such as vinyl chloride-vinyl acetate copolymers. It is eminently suited for the treatment of organic derivatives of cellulose, including, for example, cellulose acetate, cellulose propionate, cellulose butyrate, cellulose acetate formate, cellulose acetate propionate, cellulose acetate butyrate, cellulose benzoate, and ethyl cellulose. In the cellulose derivatives the hydroxyl groups of the anhydroglucose units of the cellulose molecules can be substantially completely replaced as in cellulose triacetate or they can be partially replaced as in ripened cellulose acetate wherein about 0.6 free hydroxyl group per anhydroglucose unit is present.

The following examples are given to illustrate the invention further.

EXAMPLE I

A tow comprising 30,000 filaments of cellulose acetate having an acetyl value of 55% by weight calculated as acetic acid, each filament of which is 5.5 denier and Y-shaped in cross-section, finished with about 1.5% by weight of the composition of Example III of Fortess et al. Patent No. 2,676,924, is passed first through a stuffing box crimper operating to impart thereto about 7 crimps per inch of an amplitude varying between 0.5–4.0 mm. The crimped tow then is wet with water and passed through a second stuffing box crimper which increases the crimp to about 9 crimps per inch of an amplitude varying between 0.5–4.0 mm. The tow is then cut into staple fibers about 1½ inches in length. The specific volume of the staple fibers when placed in a vessel and put under a pressure of 2.5 pounds per square inch is about 0.75 cubic inch per gram whereas if the second crimping operation is omitted the specific volume is about 0.70 cubic inch per gram.

EXAMPLE II

The procedure of Example I is repeated, substituting for the lubricant there described a quaternary ammonium lubricant sold under the trade name of Ahco 111. The staple fibers which are almost of equal specific volume are bright and have a very soft, luxurious hand.

EXAMPLE III

By the process of Example I, cellulose acetate filament yarns spun through orifices of different shape and each 4 denier per filament were double crimped and cut into staple fiber. The relative specific volumes are indicated in the following table:

*Table*

| Orifice Shape | Filament Cross-Section | Spec. Volume, Cubic in./Gm. |
|---|---|---|
| Circular | Regular Bulbous | 0.49 |
| Semi-Circular | "U" or crescent | 0.60 |
| Square | "X" or "H" | 0.62 |

EXAMPLE IV

A tow was formed of cellulose acetate filaments spun through a 70-hole jet having pentagonal orifices and another 70-hole jet having triangular orifices, each filament being 8 denier. The tow was processed as in Example I to produce double-crimped staple fibers having a specific volume of 0.6 cubic inch per gram as opposed to a specific volume of 0.5 cubic inch per gram for regular staple.

It is to be understood that the foregoing detailed description is merely given by way of illustration and that many variations may be made therein without departing from the spirit of our invention.

Having described our invention, what we desire to secure by Letters Patent is:

1. The process which comprises subjecting synthetic textile filamentary material of less than about 25 denier to a first crimping operation to impart from about 5 to 8 crimps per inch of an amplitude of 0.5 to 4.0 mm., and subsequently subjecting said material to at least one additional random crimping operation by a stuffing box crimping capable of imparting 5 to 8 crimps per inch of an amplitude of 0.5 to 4.0 mm. to said filamentary material when uncrimped, thereby to impart a three-dimensional random structure of high bulk.

2. The process set forth in claim 1, wherein said filamentary material comprises a tow of continuous filaments.

3. The process set forth in claim 1 wherein at least some of said filaments are Y-shaped in cross-section.

4. The process set forth in claim 1, wherein each of said filaments ranges in denier from about 5 to 10.

5. The process as set forth in claim 1 wherein at least a portion of said filamentary material has a cross section produced by formation of said material by extrusion through a non-circular orifice.

6. The process as set forth in claim 1 wherein said filamentary material comprises cellulose acetate filaments.

7. The process which comprises spinning a solution of filament-forming material to form a plurality of synthetic textile continuous filaments each of less than about 25 denier, subjecting said filaments to a first crimping operation to impart from about 5 to 8 crimps per inch of an amplitude of 0.5 to 4.0 mm., and then subjecting said filaments to at least one additional random crimping operation by a stuffing box crimping capable of imparting 5 to 8 crimps per inch of an amplitude of 0.5 to 4.0 mm. to said filaments when uncrimped, thereby to impart a three-dimensional random structure of high bulk with the crimps extending in a plurality of planes.

8. The process set forth in claim 7, including the further step of cutting the double-crimped filaments into staple fibers.

9. The process set forth in claim 7, wherein at least some of said filaments are spun through non-circular orifices.

10. Synthetic textile filamentary material of less than about 25 denier crimped in a first direction to the extent of random from about 5 to 8 crimps per inch and having superimposed thereon a second set of crimps imparted by a stuffing box crimping to give a total of from about 7 to 10 crimps per inch, the second set of crimps lying in a plurality of planes directed at an angle to the general plane of the first set of crimps.

11. An article stuffed with filamentary material as defined in claim 10.

12. Filamentary material as defined in claim 10, wherein the filamentary material has a specific volume at least 20% greater than that of filaments of equal denier spun through circular orifices.

13. The product of claim 12 wherein said filamentary material is cellulose acetate staple having a specific volume under pressure of 2.5 pounds per square inch of at least 0.6 cubic inch per gram.

14. Cellulose acetate staple fiber as defined in claim 13, wherein the major portion of the filaments are Y-shaped in cross-section.

15. Bedding stuffed with cellulose acetate staple fiber as defined in claim 13.

16. An article stuffed with filamentary material as defined in claim 13, substantially all of said filamentary material being Y-shaped in cross-section.

17. The process which comprises spinning a solution of a filament-forming material through orifices at least some of which are non-circular to form a plurality of synthetic textile continuous filaments each of about 3 to about 25 denier and having a specific volume at least 20% greater than that of filaments of equal denier spun through circular orifices only, gathering said filaments into a tow, crimping said tow a first time to impart from about 5 to 8 crimps per inch of an amplitude of 0.5 to 4.0 mm., and randomly crimping said tow at least one more time by a stuffing box crimping, capable of imparting from about 5 to 8 crimps per inch of an amplitude of 0.5 to 4.0 mm. to said filaments when uncrimped.

18. The process of claim 17 wherein said filament-forming material is cellulose acetate and said continuous filaments having a specific volume at least 20% greater than that of filaments of equal denier spun through circular orifices only, are Y-shaped filaments.

References Cited in the file of this patent

UNITED STATES PATENTS

| | | |
|---|---|---|
| 2,326,174 | Rutishauser | Aug. 10, 1943 |
| 2,575,781 | Barach | Nov. 20, 1951 |
| 2,647,285 | Pfau | Aug. 4, 1953 |
| 2,715,309 | Rosenstein et al. | Aug. 16, 1955 |
| 2,750,653 | White | June 19, 1956 |
| 2,865,080 | Hentschel | Dec. 23, 1958 |